June 14, 1966 R. J. GARGRAVE 3,255,658

THREE SIDED THREAD OPENING

Original Filed June 20, 1960

INVENTOR.
ROBERT J. GARGRAVE
BY Tom Walker
ATTORNEY

United States Patent Office 3,255,658
Patented June 14, 1966

3,255,658
THREE SIDED THREAD OPENING
Robert J. Gargrave, Dayton, Ohio, assignor to Dayton Perforators, Inc., Dayton, Ohio, a corporation of Ohio
Continuation of application Ser. No. 37,204, June 20, 1960. This application Aug. 17, 1964, Ser. No. 391,360
2 Claims. (Cl. 85—32)

This application is a continuation of my prior application, Serial No. 37,204, filed June 20, 1960, and now abandoned.

This invention relates to fastening devices and more particularly to improvements in such devices which consist of self-tapping type screws arranged to interlock with and form a clamping unit with a sheet metal or like companion part.

Screws, as described, are self-tapping in that they are capable of forming their own thread when installed in sheet material in a pre-formed or self-made hole. So installed, the sheet material is, in either case, scarred or deformed about the edge of the hole.

In forming the conventional fastening device of the type described, the screw is usually applied in a companion part having a pre-formed hole. Such hole is generally round and formed to provide an opening which is, in any case, larger than the shank or minor diameter of the applied screw. Further, the hole, at least in part, is smaller than the major diameter of the screw, such diameter being defined by the outer periphery of its projected thread. The lead edges of the screw are therefore so dimensioned that in effecting engagement of the screw the thread thereof can be caused to obtain a slight grip on the edge of the hole. To achieve this engagement with the sheet material, the screw thread is so applied to thrust its way into or through the hole. In the process, in either case, the edge of the hole is inherently scarred or deformed.

According to another conventional practice in providing fasteners of the type described, before application of the screw the area around the hole is pre-formed to an involute shape to receive the screw thread without need for further scarring or deformation. However, deformation or scarring is nevertheless necessary and present in the first instance.

It is a characteristic of the prior art fastening devices of the type described that, as applied, the tapping-type screw obtains a relatively limited engagement with its companion part, is unstable in application and, in many instances, has a loose fit. This, of course, indicates that heretofore the facility with which a secure installation of the screw could be effected has been limited. This has naturally posed disadvantages and problems in the utilization of a fastening or clamping type screw of the type described which the present invention is directed to overcome.

The object of the present invention is to simplify the construction as well as the means and mode of operation of the fastening means of the type described whereby such means may not only be economically manufactured but will be more efficient and satisfactory in use, adaptable to a wide variety of applications and be unlikely to get out of order.

Another object of the invention is to provide improvements in fastening or clamping devices of the type described whereby the stable application of the tapping-type screw is facilitated and may be achieved in a manner to preclude undesirable scarring or deformation of its companion part.

A further object of the invention is to provide a fastening device including, in conjunction with a self-tapping type screw, an element of sheet material having a pre-formed hole, the opening for which is cut without deformation of its sides and to a form to provide for facile and secure installation of the screw.

An additional object of the invention is to provide a fastening or clamping device consisting of a self-tapping type screw in conjunction with a sheet-like element having a pre-formed hole to receive the screw, the sides of said hole being so oriented and dimensioned that on application of the screw, they mutually contact its shank and stabilize the screw as the thread thereof is guided thereby into clamping engagement therewith.

Another object of the invention is to provide a fastening or clamping device utilizing a self-tapping type screw in conjunction with a companion part having an improved hole form which facilitates the application of the screw in a manner to insure a more secure clamping action, the hole form being such that it can be readily achieved by a simple punching operation.

A further object of the invention is to provide fastening means possessing the advantageous structural features, the inherent meritorious characteristics and the mode of application and operation herein mentioned.

With the above and other incidental objects in view, as will more fully appear in the specification, the invention intended to be protected by Letters Patent consists of the features of construction, the parts and combinations thereof, and the mode of operation as hereinafter described or illustrated in the accompanying drawings or their equivalents.

Referring to the accompanying drawing wherein is shown one but obviously not necessarily the only form of embodiment of the invention, FIG. 1 is a plan view of a fragment of an element of sheet material showing a hole form for receiving a tapping-type screw in accordance with an embodiment of the invention;

The invention may find its embodiment, for example, in sheet metal nuts and the like cooperating with the self-tapping type screw to hold one part in clamped relation to another. In the illustrated instances, however the invention embodiments are disclosed as providing, in conjunction with self-tapping type screws, elements of sheet material of general utility having particular hole forms to receive the screw in a more facile manner and offer improved fastening results. These embodiments have special utility in reference to an installation in which it is desired to inhibit scarring and deformation of the sheet material through which the screw is passed to effect a fastening of parts.

Figure 1:
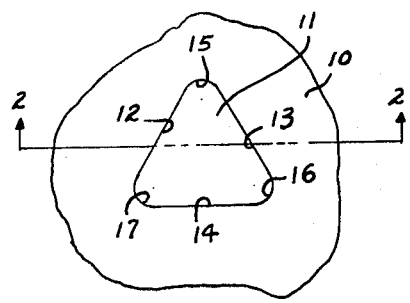
Figure 2:
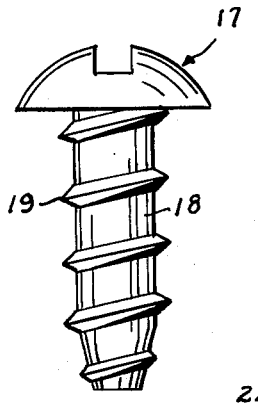
FIG. 2 is a view in section through the sheet fragment of FIG. 1, showing a self-tapping screw aligned with the hole for installation in the sheet material to produce the improved fastener in accordance with the present invention.

As shown in FIG. 1, a sheet element 10 constituting one part of a fastening device in accordance with the invention is provided with a hole 11. The hole is pre-formed by a punching operation carried out under such conditions to avoid beading or deforming of the sheet material in the vicinity of the hole. The sides of the hole are so designed to occupy a single plane in the sheet material in which the hole is formed. Shaped in correspondence with the configuration of the punch by which it is formed, the hole 11, as shown, has the approximate outline of an equilateral triangle. It has three straight sides 12, 13 and 14, and, formed intermediate these sides, at their respectively adjacent ends, corners or angles 15, 16 and 17. The angles in the illustrated instance are rounded. The sides 12, 13 and 14 are spaced equidistantly from the center of the hole, this distance being arranged to correspond in dimension to the radius of the body of the shank, per se, of a screw 17 to be applied as the other part of the fastening device as contemplated by the present invention. The shank of the screw 17 is considered, for the convenience of this description, as having a stragiht sided portion 18 the body of which determines the minor diameter of the screw. The projected periphery of its helical thread portion 19 provides the major diameter of the screw.

The minor diameter of the screw, as defined by the shank portion 18, agrees, as above described, with the diameter delineated by the minimal radial dimensions of the hole 11 as defined by the sides 12, 13 and 14. Therefore, as will be described, when a fastening device is achieved by the application of the self-tapping type screw 17 to the sheet element 10, the central portions of sides 12, 13 and 14 simultaneously engage screw portion 18 to thereby stabilize the screw and guide it centrally through the hole without allowing relative motion of the screw in a lateral sense.

The screw portion 19 provides a projected thread the body of which, at its inner periphery, has a radial dimension corresponding to the aforementioned minimal radial dimension of the hole 11. However, its maximum radial dimension is less than the distance from the center of the hole to its respective corners 15, 16 and 17.

In accordance with the invention, to provide a fastener or clamping device consisting of the element 10 and the screw 17, the screw thread 19 is so introduced to the hole 11 to be first received through an angle portion 15, 16 or 17 and guided by rotation of the screw into an underlying gripping relation to a hole edge as provided by a side 12, 13 or 14. Continued rotary motion of the screw about its axis results in an axial movement of the screw into and through the hole 11. As mentioned preivously, the hole form is such that during the threading of the screw as described the sides 12, 13 and 14 provide a continuous stabilizing three point contact with the body of the screw shank. It is noted thereby that, due to the stability of the screw movement, that at any or all of the aforementioned contact points, the peripheral edge of the screw engages under a nearly square surface of the sheet element for easier threading relative thereto.

Figure 4:
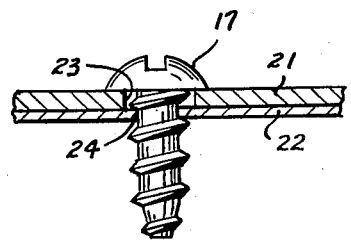
FIG. 4 is a view in cross-section showing a self-tapping type screw installed in its companion part to clamp a sheet element to said part in a facile and effective manner.

FIG. 4 of the drawings reveals a use of the instant inventive concept for the attachment of one member to another. As shown, superposed sheets or sheet elements 21 and 22 are provided with aligned openings 23 and 24 for passage therethrough of the shank of a screw 17. The opening 23 as provided in the upper sheet element 21 may be round or otherwise conveniently formed to freely pass the major diameter of the screw while causing the head of the screw to abut the outermost surface of the part 21. In this case the element 22 corresponds to the fastening element 10, previously described, and may have any suitable extent. The opening 24 as provided in the element 22 corresponds to the opening 11 and such opening is adapted thereby to receive a screw 17 in the manner previously described. Accordingly, on application, the screw 17 will have both its shank and thread pass freely through the opening 23 in the element 21 as the lead portion of the screw thread is caused to advance through the hole provided by the opening 24 and to move into an underlying gripping relation to the hole edge as provided by its sides 12, 13 and 14. The shank of the screw is at the same time firmly and stably guided throughout by a three point contact with the edges of the opening, also as previously described.

It may therefore be seen that there is an ease of application and control of the screw and, in the process, parts 21 and 22 are gripped between the screw thread and its head without deformation or scarring of any consequence.

A most firm and secure yet facile engagement of the parts is provided in the manner described. The advantages of the fastening or clamping unit are believed readily apparent when contrasted to the prior art fastening devices of similar nature.

Figure 3:
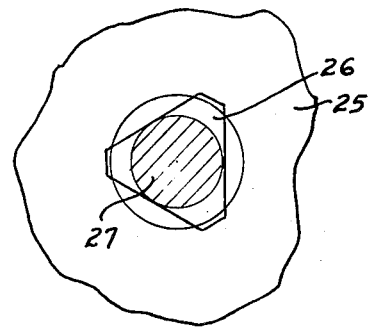
FIG. 3 is a view like that of FIG. 1 but showing a screw installed in a sheet element having a hole form of slightly modified configuration.

FIG. 3 shows another fastener element 25 of sheet material, which element has a modified hole configuration for receipt of a tapping-type screw 27. In this instance, the element 25 has a hole 26 having the approximate shape of an equilateral triangle, in the same manner as the hole 11, but in this instance the lateral enlargements at the corners of the hole are cut off squarely rather than rounded. Element 26 may be utilized with a self-tapping type screw in a manner just as previously described to achieve a fastening device in accordance with the present invention. It is noted that other hole forms are possible in a substantially infinite number of variations within the concept of providing circumferentially spaced apart points of contact with the minor diameter of a screw while providing intermediate enlargements capable of receipt of the spiral configuration represented by the screw thread as described. The sides of the hole need not be straight but may assume arcuate and other configurations as long as the contact points are provided for stable engagement of the shank of the applied screw. In the example illustrated, three points of contact are provided as affording the minimal basis for achieving a fastening device in accordance with the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A fastening device comprising a first element including a flat portion of sheet-like character having an opening in the form of a triangle including straight sides of substantially equal length, said sides terminating at their ends in and joined by a curved portion at each corner of said opening, said sides and curved portions lying in a common plane, and a screw for application through said opening to form a fastener with said first element, said screw having a cylindrical elongated shank portion and a peripheral thread which projects outwardly from said shank portion and which terminates in a tapered lead portion, the convolutions of said thread being axially spaced whereby a part of said shank portion at least equal to the thickness of said first element is exposed between each convolution, the radial distance between the center of said opening to each side of said opening substantially midway between the ends thereof being substantially equal to the radius of said shank portion of said screw and the distance from the center of said opening to each corner of said opening exceeding the crest diameter of said screw thread whereby to provide for the thread on said screw to freely enter said opening and grip said first element in initially underlying relatively deformation free contact with one of said sides, said sides of said hole providing a continuous and simultaneous guiding contact with the minor diameter of the screw as defined by said shank portion so as to provide a firm and stabilized containment of the screw in the course of its movement through said sheet material.

2. A fastening device comprising a first element including a flat portion of sheet-like character and further including an opening have only three sides of substantially equal length, said sides terminating at their ends in and joined by a curved portion at each corner of said opening, said sides and curved portions lying in a common plane, and a screw for application through said opening to form a fastener with said first element, said screw having a cylindrical elongated shank portion and a peripheral thread which projects outwardly from said shank portion and which terminates in a tapered lead portion, the convolutions of said thread being axially spaced whereby a part of said shank portion at least equal to the thickness of said first element is exposed between each convolution, the radial distance between the center of said opening to each side of said opening substantially midway between the ends thereof being substantially equal to the radius of said shank portion of said screw and the distance from the center of said opening to each corner of said opening exceeding the crest diameter of said screw thread whereby to provide for the thread on said screw to freely enter said opening and grip said first element in initially underlying relatively deformation free contact with one of said sides, said sides of said hole providing a continuous and simultaneous guiding contact with the minor diameter of the screw as defined by said shank portion so as to provide a firm and stabilized containment of the screw in the course of its movement through said sheet material.

References Cited by the Examiner

UNITED STATES PATENTS

| 343,245 | 6/1886 | Kregel. | |
| 1,926,686 | 9/1933 | Newton | 85—41 |
| 2,000,732 | 5/1935 | Zelt | 85—36 |
| 2,824,480 | 2/1958 | Hotchkin. | |

FOREIGN PATENTS

| 875,342 | 6/1942 | France. |

EDWARD C. ALLEN, *Primary Examiner.*